Figure 2B:
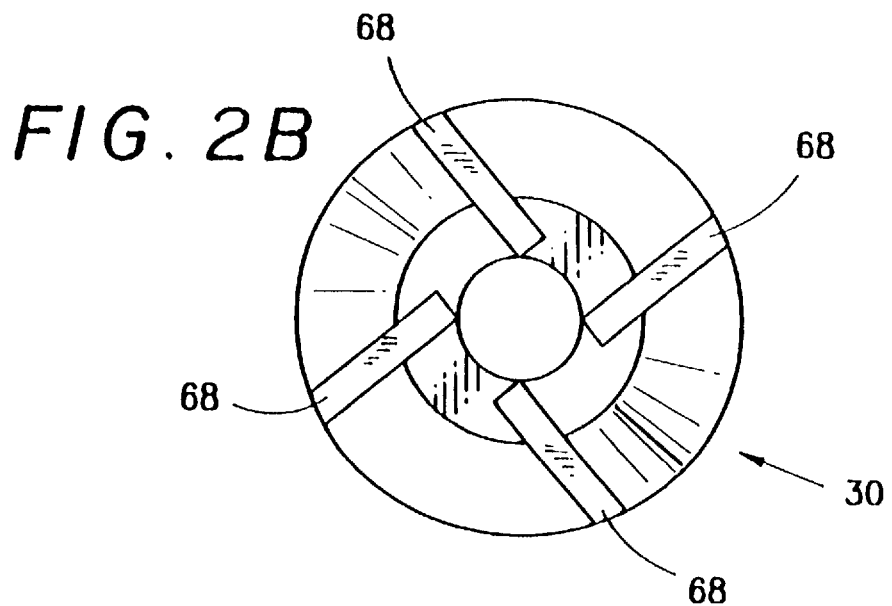

United States Patent [19]
Herr et al.

[11] Patent Number: 5,806,762
[45] Date of Patent: Sep. 15, 1998

[54] AIRLESS ATOMIZING NOZZLE AND SYSTEM FOR HUMIDITY CONTROL

[75] Inventors: D. Scott Herr, Lancaster; William Kane, Philadelphia, both of Pa.

[73] Assignee: DGH Systems, L.L.C., Lancaster, Pa.

[21] Appl. No.: 857,246

[22] Filed: May 16, 1997

Related U.S. Application Data

[62] Division of Ser. No. 592,710, Jan. 26, 1996, Pat. No. 5,765,752.

[51] Int. Cl.⁶ .............................. B01F 3/02; G05D 21/00
[52] U.S. Cl. .......................... 236/44 A; 62/171; 236/1 E
[58] Field of Search .................................. 236/1 E, 44 B, 236/1 EA, 44 A; 165/229, 223; 62/171; 261/DIG. 34, 27; 239/444

[56] References Cited

U.S. PATENT DOCUMENTS

| | | | |
|---|---|---|---|
| 1,721,422 | 7/1929 | Utz | 239/116 |
| 1,879,012 | 9/1932 | Armstrong | 239/170 |
| 2,173,072 | 9/1939 | Loepsinger | 261/39.1 |
| 2,614,885 | 10/1952 | Roell et al. | 239/170 |
| 3,126,427 | 3/1964 | Broughton | 239/116 |
| 3,178,119 | 4/1965 | Thorson | 239/170 |
| 3,911,060 | 10/1975 | Bradley, Jr. et al. | 261/27 |
| 3,945,572 | 3/1976 | Bockenstette, II | 239/171 |
| 4,789,097 | 12/1988 | Anderson et al. | 236/44 A |
| 4,968,457 | 11/1990 | Welch | 261/39.1 |
| 5,074,470 | 12/1991 | Rosenplanter et al. | 239/116 |
| 5,346,128 | 9/1994 | Wacker | 236/44 A |

Primary Examiner—William Wayner
Attorney, Agent, or Firm—Shlesinger Arkwright & Garvey LLP

[57] ABSTRACT

An atomizing nozzle assembly, comprises a body; a nozzle head secured to the body, the nozzle including a chamber and an orifice for permitting water to flow out; a stem disposed within the chamber, the stem including a tip adapted to slide into or out of the orifice, thereby closing or opening the orifice, respectively; a piston secured to a rear end of the stem, the piston being slidably disposed within a cavity in the body; a spring disposed behind the piston adapted to bias the piston forward such that the tip is disposed within the orifice to close off the orifice when liquid to the nozzle assembly is cut off; a passageway within the body communicating with the chamber and the orifice, the passageway for connecting to a liquid supply to be atomized; and the tip including a resilient tubing adapted to provide a seal against the orifice when the tip is the closed position.

6 Claims, 6 Drawing Sheets

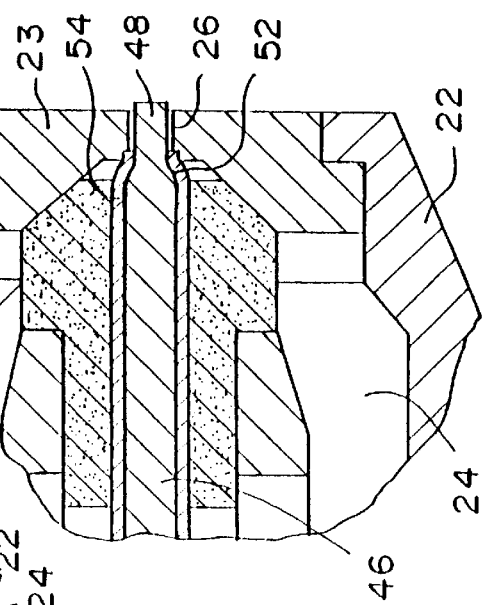
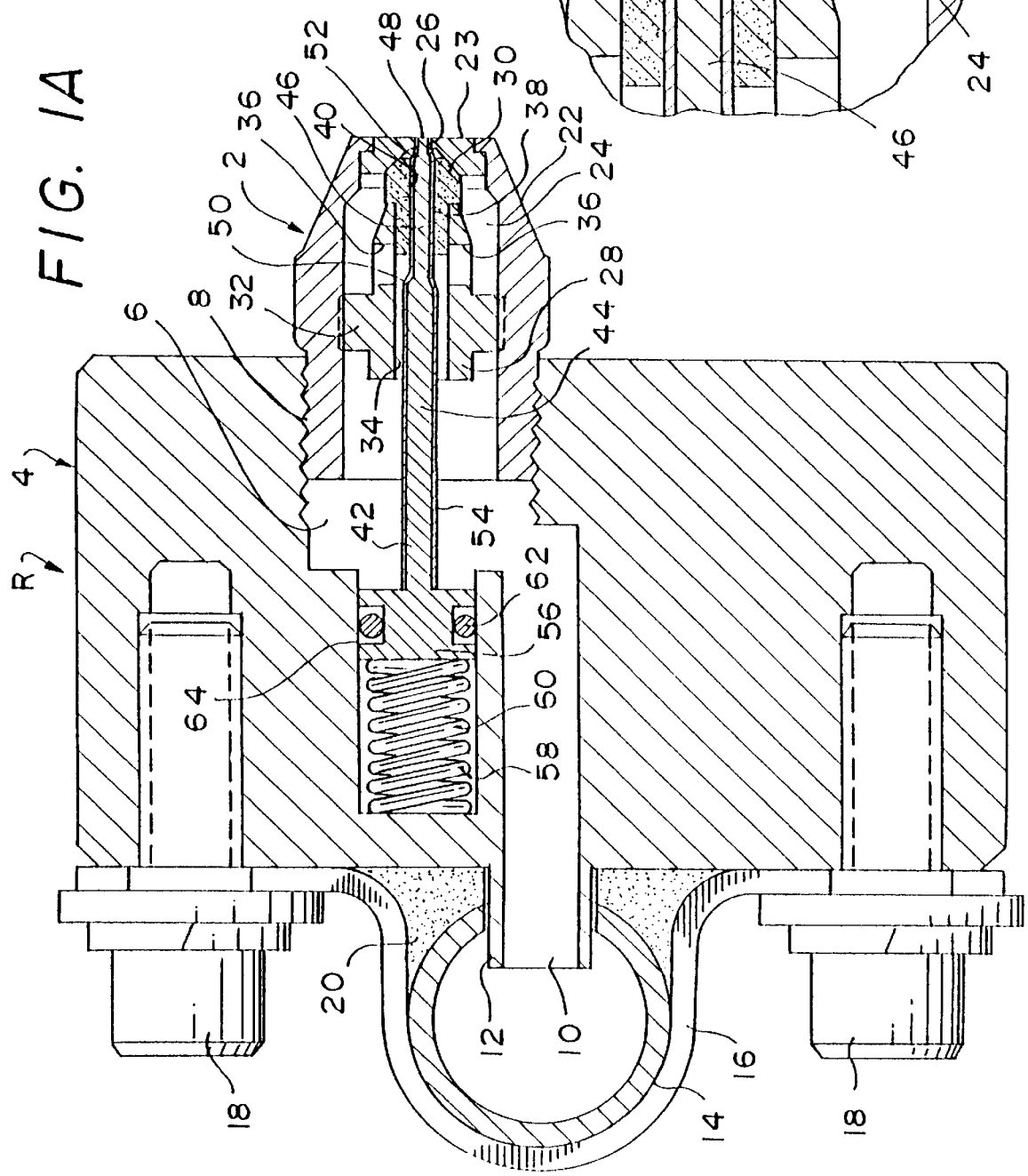

5,806,762

AIRLESS ATOMIZING NOZZLE AND SYSTEM FOR HUMIDITY CONTROL

This is a division of Ser. No. 08/592,710, filed Jan. 26, 1996, now U.S. Pat. No. 5,765,752.

FIELD OF THE INVENTION

The present invention relates generally to an airless atomizing nozzle for dispensing liquid for humidification, evaporative cooling, spray painting, etc. and particularly to a nozzle that is self-cleaning, self-sealing and water-pressure modulated. The present invention also relates to a system and method for providing humidification to a room.

BACKGROUND OF THE INVENTION

There is a need for an airless atomizing nozzle that will provide relatively reliable, precise humidification and on shutdown will clean the orifice and seal the head.

There is also a need for a humidification system that can be activated in stages to meet demand, thereby providing relatively precise control.

OBJECTS AND SUMMARY OF THE INVENTION

It is an object of the present invention to provide an atomizing nozzle assembly that has an orifice that is self-cleaning.

It is also an object of the present invention to provide an atomizing nozzle assembly that is self-sealing on shut-down.

It is still another object of the present to provide an atomizing nozzle assembly that has a single integrated body for securing the water supply line in a proper position, for providing a heat-sink to prevent the nozzle from warping when exposed to heat or cold and for setting up a vacuum around the nozzle as air flows over it to permit the atomized mist to spread out more.

It is yet another object of the present invention to provide an atomizing nozzle assembly that is self-modulating as tile water pressure is increased or decreased.

It is also an object of the present invention to provide a humidification system for relatively precise control of the humidity in a room, where a number of atomizing nozzles are arranged in stages and are brought online in stages to meet demand.

In summary the present invention provides an atomizing nozzle assembly comprising a body; a nozzle head secured to the body, the nozzle including a chamber and an orifice for permitting water to flow out; a stem disposed within the chamber, the stem including a tip adapted to slide into or out of the orifice, thereby closing or opening the orifice, respectively; a piston secured to a rear end of the stem, the piston being slidably disposed within a cavity in the body; a spring disposed behind the piston adapted to bias the piston forward such that the tip is disposed within the orifice to close off the orifice when liquid to the nozzle assembly is cut off; a passageway within the body communicating with the chamber and the orifice, the passageway for connecting to a liquid supply to be atomized; and the tip including a resilient tubing adapted to provide a seal against the orifice when the tip is the closed position.

These and other objects of the present invention will become apparent from the following detailed description.

BRIEF DESCRIPTION OF THE DRAWINGS

FIG. 1A is a cross-sectional view of an atomizing nozzle assembly made in accordance with the present invention.

FIG. 1B is an enlarged cross-sectional view of the front portion of the nozzle assembly of FIG. 1A.

FIGS. 2A and 2B are enlarged side and end views, respectively, of a water director used in the nozzle assembly of FIG. 1A.

FIG. 3 is a typical installation of a number of nozzle assemblies arranged in several stages.

FIG. 4 is a system application for humidification using the nozzle assembly of FIG. 1A.

FIG. 5 is a functional block diagram of a control system for use with the system of FIG. 4.

FIG. 6 is a graph showing a typical system operation.

DETAILED DESCRIPTION OF THE INVENTION

An atomizing nozzle assembly R made in accordance with the present invention is disclosed in FIG. 1A. The assembly R comprises a nozzle head 2 and a body 4. A threaded opening 6 in the body 4 is adapted to receive a threaded portion 8 in the nozzle head 2, as best shown in FIG. 1A. The opening 6 communicates with a water inlet passageway 10 for providing water to the nozzle head 2. A projecting pipe portion 12 connected to the body 4 is adapted to extend into the interior of a water pipe 4. A clamp 16 and bolts 18 secure the body 4 to the water pipe 14. A pre-formed gasket 20 provides a seal between the pipe 14 and the body 4.

The body 4 is a rectangular block of stainless steel to provide a single integrated body for securing to the water supply line in a proper position, for providing a heat-sink to prevent the nozzle assembly R from warping when exposed to heat or cold and for setting up a vacuum around the nozzle as air flows over it to permit the atomized mist to spread out more.

The nozzle head 2 has an outer casing 22 and a nose body 23 press-fit in an opening at the front end of the casing 22. The nose body 23 is preferably made of stainless steel for durability. The outer casing 22 has a chamber 24 communicating with an orifice 26 in the nose body 23. A water guide 28 and a director 30 secured thereto are disposed within the chamber 24 of the nozzle head 22.

The water guide 28 is substantially a longitudinal body with a diameter smaller than the diameter of the chamber 24. Flange portion 32 is threadedly secured to the inside surface of the casing 22. A longitudinal opening 34 and a transverse pair of openings 36 communicate with the chamber 24. The director 30 has a reduced diameter portion 38 disposed at the front end of the opening 34, as best shown in FIG. 1A. The director 30 has a longitudinal opening 40 concentric with the opening 34.

A stem 42 is disposed within the chambers 6 and 24, as best shown in FIG. 1A. The stem 42 has a portion disposed within the opening 34 and a reduced diameter portion disposed within the opening 40 of the director 30. The stem 42 further includes a tip 48 adapted to protrude through the orifice 26, as best shown in FIG. 1B. The tip 48 has a reduced diameter compared to the portion 46. Transition shoulders 50 and 52 are disposed between portions 44 and 46, and portion 46 and portion 48. A shrink tube 54 made of a suitable resilient material such as PVC is disposed around the stein 42, except at the tip 48, as best shown in FIG. 1A. The shrink tube 54 advantageously provides sealing means for the orifice 26 so that on a shut-down, when the stem is forced forward into the orifice 26, the shrink tube in the vicinity of the tip 48 is compressed against the orifice 26.

This design advantageously permits sealing at relatively high pressures, up to 75 psi.

The base of the stem 54 is attached to a piston 56 slidably movable within a cylinder 58. A spring 60 disposed behind the piston 68 within the cylinder 58 urges the piston outwardly such that the orifice 26 is normally closed by the tip 48 in the absence of water pressure within the body 4. An O-ring 62 disposed in a circumferential groove 64 in the piston prevents the water from entering the cylinder 58 behind the piston 56, which if filled with water would prevent the piston 56 from being pushed inwardly against the spring 60.

Figure 2A:
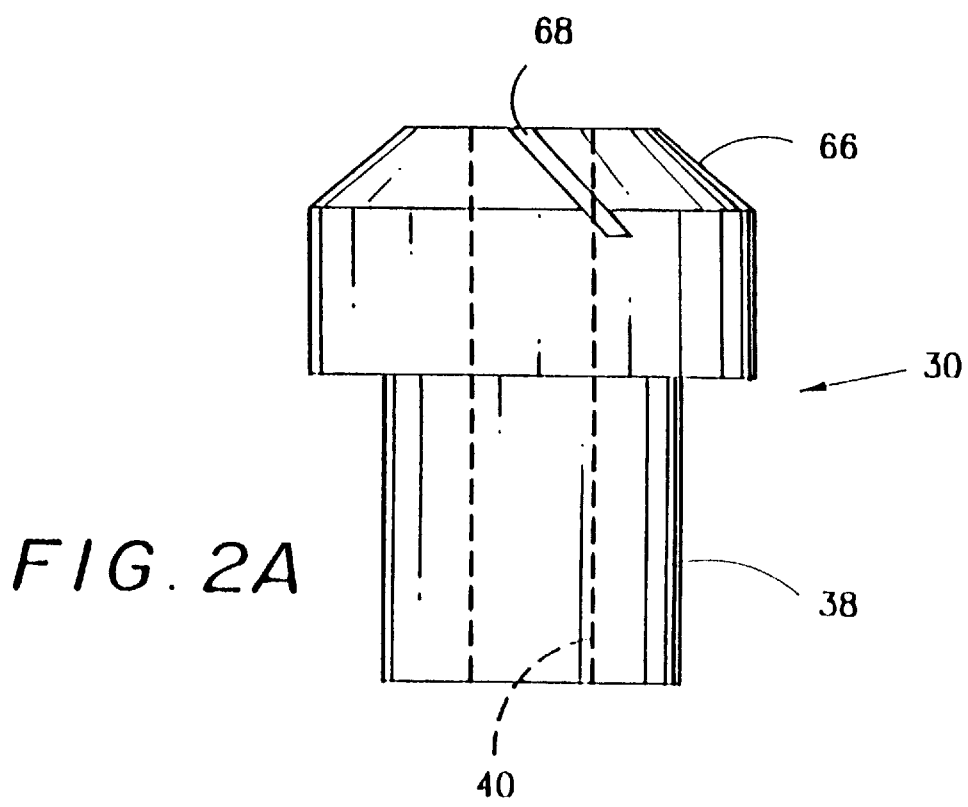

The director 30 is disclosed in greater detail in FIGS. 2A and 2B. The director 30 has a frusto-conical surface 66. A plurality of slits 68 are disposed at an angle on the surface 66 and substantially tangential to the opening 40 when viewed from the top, as best shown in FIG. 2B. The angle of the slits 68 determines the shape of the resulting spray pattern, such as solid or, hollow cone. The slits advantageously impart a circular motion to the water as it exits through the orifice 26, thereby assisting in the atomization process.

In operation, pressurized water enters the body 4 through the inlet 10 and fills up the chambers 6 and 24. The increasing water pressure pushes the piston 56 against the spring 60, compressing it. At the same time, the stem 42 and the tip 48 are pulled back by the retreating piston 56 such that the orifice 26 is opened, permitting water to flow out through the orifice 26. The water flows through the opening 34 and through the transverse openings 36 and over the director 30 through the slits 68. The slits 68 impart a spin to the water-whereby the resulting centrifugal force shears the water into fine droplets, such as 50 microns or less, as it exits the orifice 26. The nose piece 23 forces the water to flow through the slits 68.

During operation, increasing or decreasing the water pressure results in a change in the amount of water being discharged and also in the level of centrifugal force being applied by the slits. As water pressure is increased, more water is permitted to flow through the opening 34 as the length of the portion 44 that is disposed within the opening 34 is decreased. Additionally, as the tip 48 retracts, the seat that the shrink tube 54 makes at the orifice 56 is gradually reduced until it is finally clear of the orifice 26. In addition, the tip 48 modulates the free space in the orifice 26 as the tip retracts. The reverse happens when the pressure is decreased, permitting the spring to push the piston 56 outwardly, causing a partial closure of the orifice 26 or additional blockage of the opening 34 by the stem portion 44.

On shut-down, the water pressure is relieved and the spring 60 forces the piston 56 and the tip 48 forward into the orifice 26, compressing the shrink tubing into the front of the orifice 26, thereby advantageously sealing off the water flow, and forces the tip 48 out through the orifice, advantageously knocking away any mineral debris which may have formed during operation.

Although water is used above to describe the operation of the nozzle assembly R, other liquids are also equally applicable, such as oil in an oil burner, paint or any other operative liquid.

Figure 3:
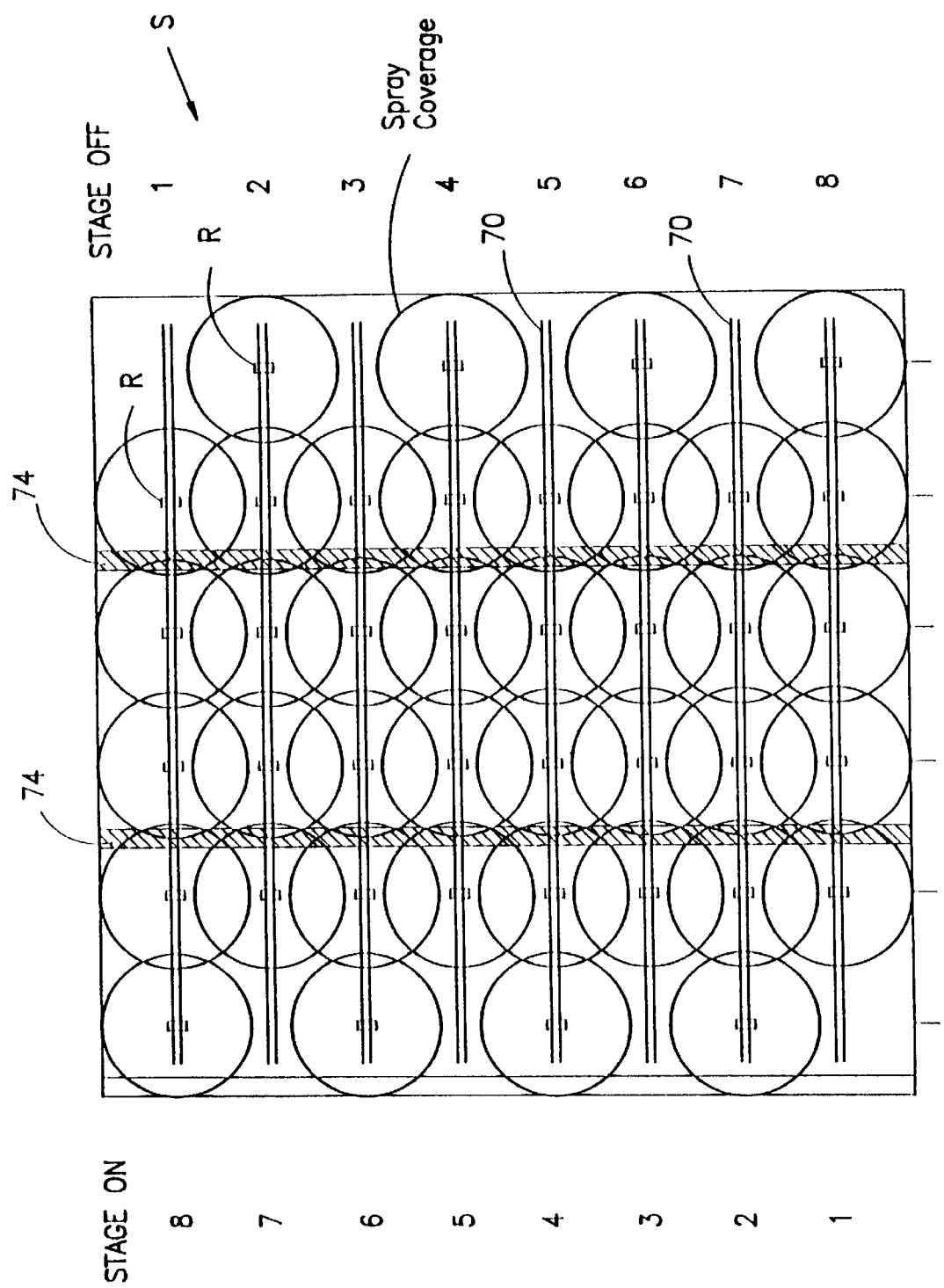
Figure 4:
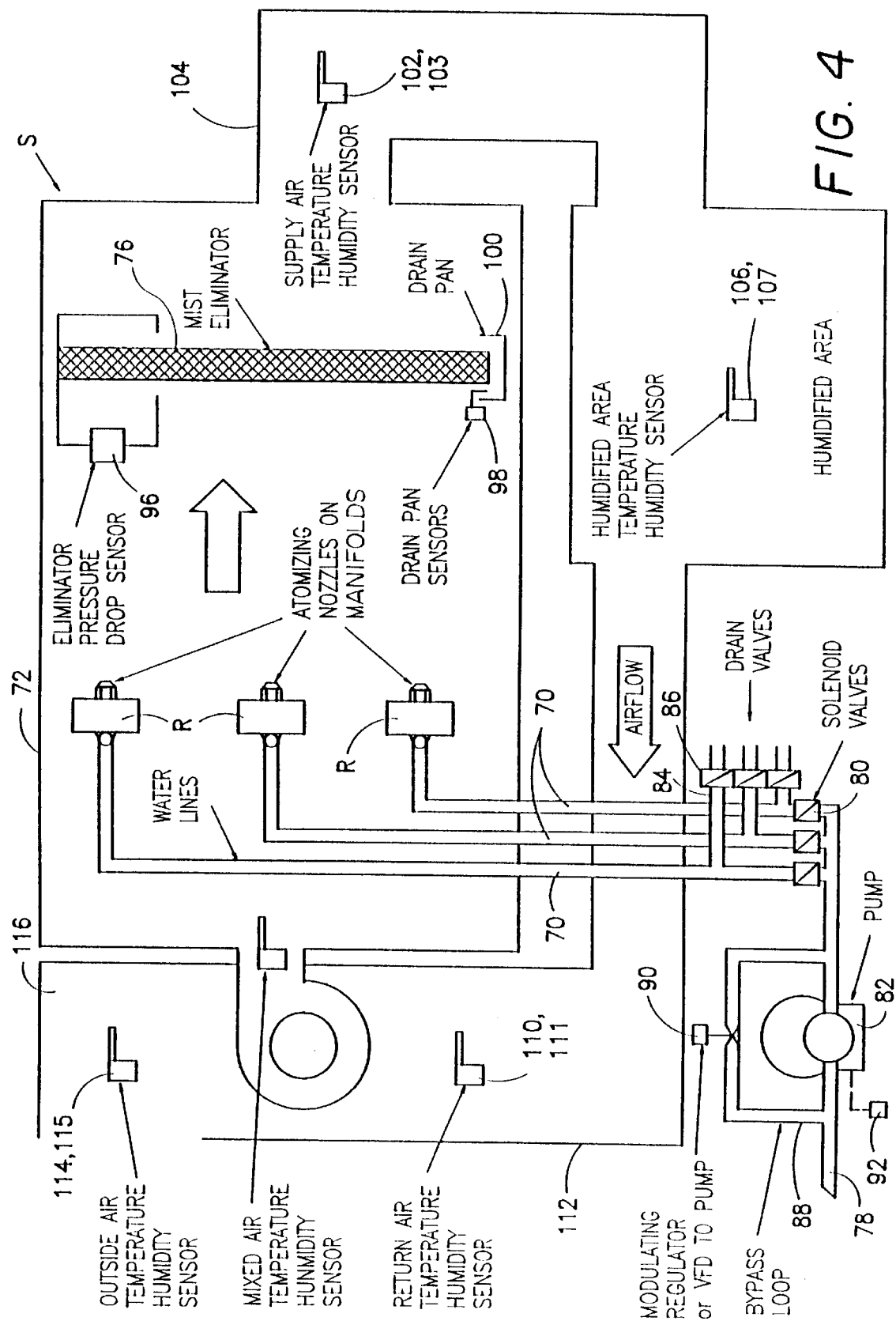
Figure 5:
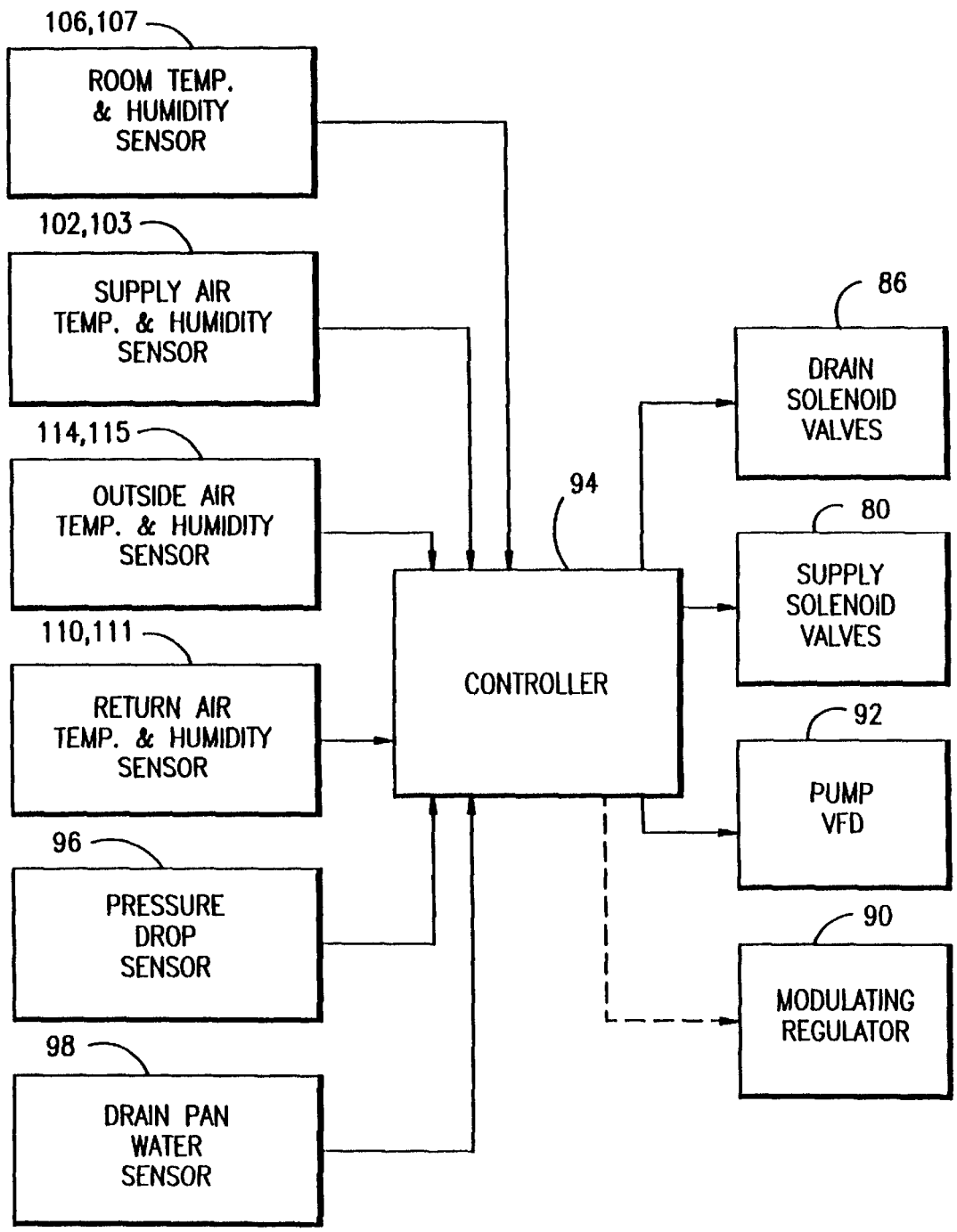

In a typical application system S, a number of the nozzles R are arranged on manifolds 70 across an airstream, either in air handler or duct 72, as best shown in FIGS. 3 and 4. The manifolds 70 are then secured to support brackets 74, as best shown in FIG. 3. A mist eliminator or evaporator pad 76 is disposed in front of the nozzles R to catch the finely atomized mist and present it to the airflow in the duct to enhance evaporation. The manifolds 70 are connected to a common water line 78 via solenoid valves 80 and pump 82. Drain pipes 84 with solenoid valves 86 may be connected to the manifolds 70. The pump 82 may be modulated with a bypass loop 88 equipped with a modulating regulator 90. Alternatively, the pump may be driven with a variable frequency drive (VFD) 92.

Several sensors are operably connected to a microprocessor-based controller 94 to provide control to the system S. A pressure drop sensor 96 senses the pressure drop across the mist eliminator 76, and is adapted to send an alarm if the pressure drop rises above a preprogrammed value. A drain pan sensor 98 senses the presence of water in the drain pan 100. Indication of water in the drain pan 100 means that water moisture is not being absorbed by the airstream. Temperature and humidity sensors 102 and 103 are disposed in a supply air duct 104. Temperature and humidity sensors 106 and 107 are disposed in the humidified area 108. Temperature and humidity sensors 110 and 111 are disposed in a return-air duct 112. Temperature and humidity sensors 114 and 115 are disposed in an outside air inlet duct 116.

In operation, the controller 94 reads all the sensors continuously for monitoring and control. The controller 94 compares the humidity in the humidified area 108 to a programmable set point and bandwidth (typically 60% RH±5%). The nozzle assemblies R are typically arranged in eight stages, as best shown in FIG. 3, with number 1 stage at the bottom and number 8 stage at the top. When the humidity in the area 108 falls below the humidity set point and the first stage programmable start point within the bandwidth, the controller 94 will activate the first stage manifold water solenoid valve 80, activate the pump variable frequency drive 92 and send a programmed first stage low output signal to the pump drive 92. As the humidity in the area 108 continues to fall further below the humidity set point, the controller 94 will proportionally ramp the pump variable frequency drive signal to the high output setting for the first stage.

After a programmable stage delay time, if the humidity in the area 108 continues to fall below the humidity set point and the second stage programmable start point within the bandwidth, the controller 94 will activate the second stage manifold water solenoid valve 80 and increase the output signal to the pump variable frequency drive 92 to the second stage programmed output setting. Likewise, as the room humidity continues to fall further below the humidity set point, the controller 94 will proportionally ramp the pump variable frequency drive signal to the high output setting for that stage.

As the room humidity falls below the humidity set point and the additional stage start points, the controller 94 will activate the appropriate stage manifold water solenoid valve and increase the output signal to the pump variable frequency drive to that stage programmed low output setting and then ramp it proportionally to the high output setting to meet demand.

As the humidifier stages provide capacity to meet demand, and as the room humidity rises toward the set point, the controller 94 will deactivate each stage manifold water solenoid valves in reverse sequence and decrease the program stage output signal to the pump variable frequency drive according to reverse proportional ramping.

On reaching the set point, all stage manifold water solenoid valves will be off and the controller 94 will deactivate the pump 82. Additionally, the controller 94 will time each stage after each activation and after a period of continuous operation, preferably 30 minutes, the controller 94 will deactivate the stage manifold water solenoid valves for that stage, for a short period, such as 15 seconds, and then reactivate it. This advantageously effects the cleaning of the nozzles through the self-cleaning mechanism of nozzle assembly R described above.

If the controller 94 reads too much water in the drain pan 100, the controller 94 will deactivate the stage solenoid valve and then modulate the pump variable frequency drive to control the pressure of the water at the nozzle assemblies R.

It should be understood that whenever the supply solenoid valves 80 are activated to open the valves, the corresponding solenoid drain valves 86 are also activated to close the valves. Similarly, when the supply solenoid valves are activated to the closed position, the drain solenoid valves 86 are activated to the open position for a short period such as 30 seconds to relieve residual pressure in the nozzle assemblies R.

Figure 6:
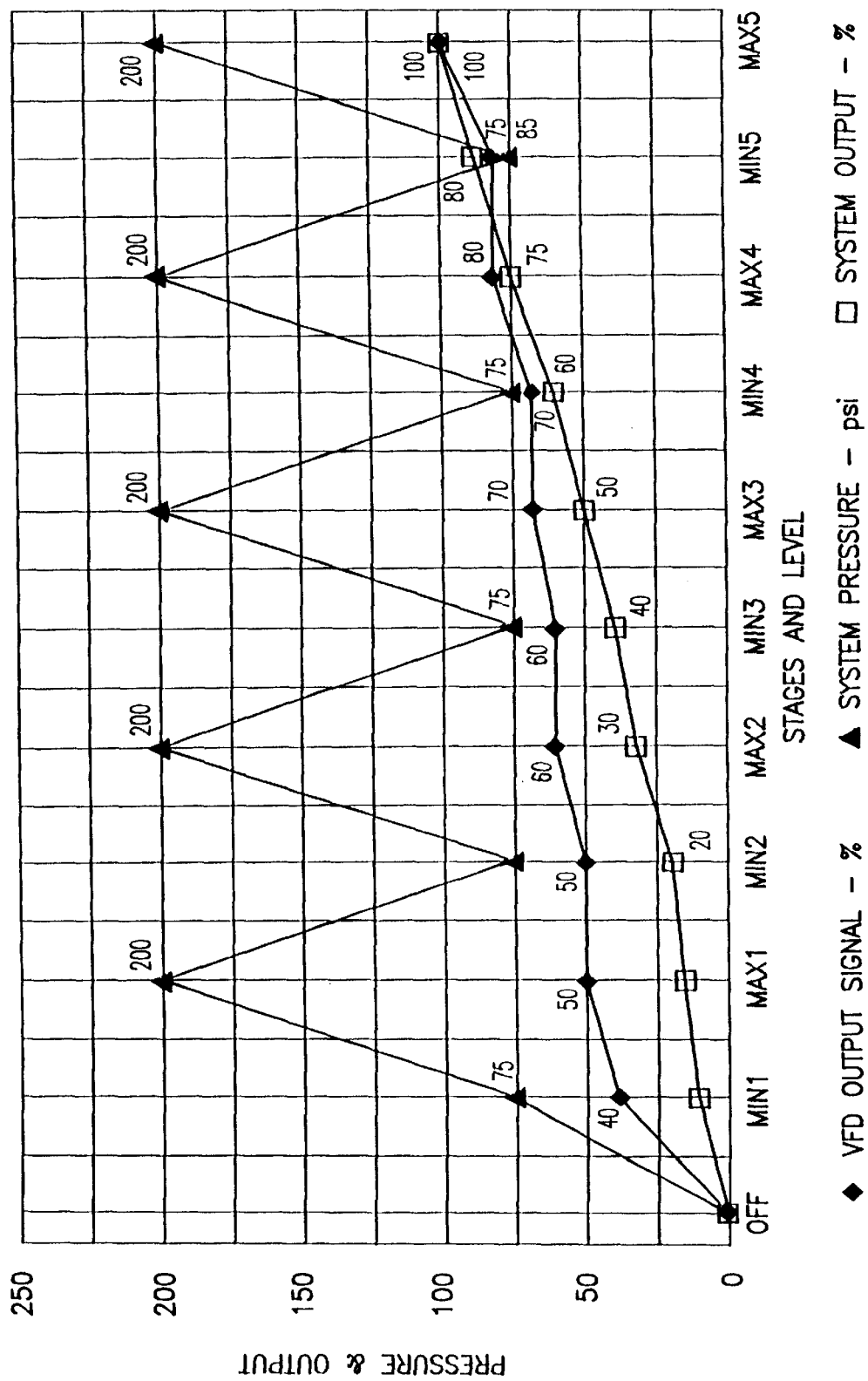

The above operation is disclosed graphically in FIG. 6 for a five stage system. Note that in a typical operation, as each stage is brought on, the VFD or modulating regulator is ramped from 75 psi to 200 psi, which results in a steady increase in system output as the system operates.

The atomizing nozzle assembly R may also be used in oil burners. In this application, the self-cleaning feature of the nozzle assembly R reduces maintenance and replacement cost and keeps the atomized mist at a higher quality thereby enhancing combustion efficiency. The self-sealing feature of the nozzle R advantageous prevents dripping into the firebox, which can result in start-up flash and premature soot deposits which reduce efficiency. This also reduces the amount of combustion by-products being released into the atmosphere. The use of the nozzle assembly R in oil burners may also eliminate the use of the solenoid valve for preventing drips from the nozzle.

The nozzle assembly R can also be used for other applications such as greenhouse humidification, chicken house evaporative cooling, etc.

In an evaporative cooling application, the controller 94 will operate the system to reduce the humidified area temperature so long as the humidified area humidity does not rise above the set point.

The components of the nozzle assembly R are preferably made from durable material, such as stainless steel.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:

1. A humidifier system, comprising:

a) first and second nozzles for being disposed within an air duct;

b) a controller for controlling the operation of said nozzles;

c) each nozzle being connected to a water line;

d) first and second solenoid valves connected to respective said first and second nozzles, said first and second solenoid valves being operably connected to said controller;

e) a pump operably connected to said water line for pressurizing the water in said nozzles, said pump being operably connected to said controller for modulating said pump to control the pressure in said water line;

f) a humidity sensor for being disposed within the area to be humidified, said humidity sensor being operably connected to said controller such that when the room humidity falls below a preselected humidity set point, said first and second solenoids are operated in stages to provide water to said first and second nozzles and said pump is modulated to control pressure in said water line until the room humidity rises, at which time said first and second solenoid valves are turned off in stages.

2. A system as in claim 1, and further comprising:

a) a drain operably connected to each nozzle;

b) a solenoid drain valve operably connected to each drain;

c) said solenoid drain valves being operably connected to said controller such that when said supply solenoid valves are closed, said solenoid drain valves are opened to relieve pressure in said nozzles.

3. A system as in claim 1, and further comprising:

a) a drain pan sensor for being operably disposed in a drain pan associated with a mist eliminator in front of said nozzles, said drain pan sensor being operably connected to said controller such that said supply solenoid valves are closed when water in the pan is detected by said drain pan sensor.

4. A method for providing humidity to a room, comprising the steps of:

a) providing first and second nozzles in an airstream connected to the room to be humidified;

b) monitoring the humidity in the room;

c) providing water to the first nozzle when the humidity falls below a preset point;

d) providing water to the second nozzle when the humidity continues to fall below the preset point;

e) turning off water to the first and second nozzles in stages when the humidity rises in the room;

f) increasing the water pressure as the second nozzle is brought online; and g) lowering the water pressure after the second nozzle is online.

5. A method as in claim 4, and further comprising the step of:

a) waiting for a preselected delay before bringing the second nozzle online.

6. A method as in claim 4, and further comprising the step of:

a) periodically interrupting for short period of time the water flow to the nozzles; and b) piercing the orifice of the nozzles, thereby to remove airy debris that may have collected during operation.

* * * * *